United States Patent
Chen et al.

(10) Patent No.: US 9,467,831 B2
(45) Date of Patent: *Oct. 11, 2016

(54) NETWORK-ADMINISTERED CONFERENCE CALL USING SIP MESSAGING

(71) Applicant: ARRIS Enterprises, Inc., Suwanee, GA (US)

(72) Inventors: Shi Jin Chen, Alpharetta, GA (US); John Randolph Bestermann, Suwanee, GA (US); Tarun Chugh, Roswell, GA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/812,287

(22) Filed: Jul. 29, 2015

(65) Prior Publication Data

US 2015/0334244 A1 Nov. 19, 2015

Related U.S. Application Data

(63) Continuation of application No. 13/854,902, filed on Apr. 1, 2013, now Pat. No. 9,131,056.

(60) Provisional application No. 61/618,255, filed on Mar. 30, 2012.

(51) Int. Cl.

| | |
|---|---|
| *H04W 36/14* | (2009.01) |
| *H04W 4/16* | (2009.01) |
| *H04L 29/06* | (2006.01) |
| *H04M 7/00* | (2006.01) |
| *H04W 36/00* | (2009.01) |
| *H04M 3/56* | (2006.01) |

(52) U.S. Cl.
CPC ............ *H04W 4/16* (2013.01); *H04L 65/1006* (2013.01); *H04L 65/1069* (2013.01); *H04L 65/1096* (2013.01); *H04M 3/561* (2013.01); *H04M 7/006* (2013.01); *H04W 36/0011* (2013.01); *H04W 36/14* (2013.01)

(58) Field of Classification Search
None
See application file for complete search history.

(56) References Cited

U.S. PATENT DOCUMENTS

| | | | | |
|---|---|---|---|---|
| 6,011,909 | A * | 1/2000 | Newlin | H04M 3/42246 379/215.01 |
| 6,768,722 | B1 * | 7/2004 | Katseff | H04M 3/428 370/260 |
| 7,769,383 | B2 | 8/2010 | Deshpande et al. | |
| 8,638,696 | B1 * | 1/2014 | Sojka | H04L 65/403 370/260 |
| 2006/0121891 | A1 | 6/2006 | Jagadeesan et al. | |
| 2006/0222169 | A1 | 10/2006 | Morris | |
| 2006/0286984 | A1 | 12/2006 | Bonner | |
| 2007/0217589 | A1 | 9/2007 | Martin et al. | |
| 2008/0056208 | A1 * | 3/2008 | Hinrikus | H04L 12/5692 370/338 |
| 2008/0076409 | A1 | 3/2008 | Hinrikus et al. | |
| 2008/0090570 | A1 * | 4/2008 | Deshpande | H04L 65/1096 455/436 |
| 2008/0119187 | A1 | 5/2008 | Gallagher et al. | |
| 2009/0016330 | A1 * | 1/2009 | Witzel | H04L 12/66 370/352 |

(Continued)

*Primary Examiner* — Ian N Moore
*Assistant Examiner* — Lakeram Jangbahadur
(74) *Attorney, Agent, or Firm* — Bart A. Perkins

(57) ABSTRACT

Methods, systems, and apparatus can be used for the establishment of a conference call via a packet network (which may be an IP fixed packet network) administered by a communications server, including a Session Initiated Protocol (SIP) based server.

17 Claims, 4 Drawing Sheets

(56) References Cited

U.S. PATENT DOCUMENTS

| | | |
|---|---|---|
| 2009/0147754 A1 | 6/2009 | Long et al. |
| 2009/0170557 A1 | 7/2009 | Chauhan et al. |
| 2010/0035618 A1 | 2/2010 | Sugiura et al. |
| 2011/0075609 A1 | 3/2011 | Silver et al. |
| 2011/0103376 A1* | 5/2011 | Nakai ................ H04M 3/367 370/352 |
| 2011/0211584 A1* | 9/2011 | Mahmoud ........... H04L 12/2834 370/401 |

* cited by examiner

NETWORK-ADMINISTERED CONFERENCE CALL USING SIP MESSAGING

RELATED APPLICATIONS

This application is a continuation patent application claiming the benefit of U.S. patent application Ser. No. 13/854,902, entitled "Network-Administered Conference Call Using SIP Messaging," filed on Apr. 1, 2013, which is hereby incorporated herein by reference in its entirety. U.S. patent application Ser. No. 13/854,902 is a non-provisional application claiming the benefit of U.S. Provisional Application Ser. No. 61/618,255 titled "Fixed Mobile Convergence (FMC)—Example Implementations," the entirety of which is hereby incorporated by reference.

TECHNICAL FIELD

This disclosure relates to the implementation of a network-administered three-way call in a communication network using Session Initiation Protocol (SIP) signaling.

BACKGROUND

Traditionally, customers made (and still make) telephone calls via the public switched telephone network (PSTN). Modern communications now allow people to make calls over a variety of communications modalities using a variety of devices. These include several packet-switched communications solutions that provide broadband access to the Internet and World Wide Web using, for example, Internet Protocol (IP). Such solutions include digital subscriber line (DSL) service offered by telephone companies (telcos), and data over cable services (e.g., broadband services over the networks traditionally provided by cable television operators, which are often referred to as multiple system operators (MSOs)). Although these packet-based broadband IP networks have been referred to as "fixed" because of the lack of mobility of the on-premises access point, these networks can still include the use of wireless technology. For example, wireless communications can be incorporated in the delivery infrastructure of the fixed packet network (such as satellite or radio transmission towers), and fixed packet networks can employ the use of a wireless access point (such as a wireless router), which can create a local wireless network such as a local Wi-Fi network. Local wireless networks typically have limited range, but provide access to the packet network.

These fixed packet networks have also allowed users to make telephone calls (voice calls) by carrying voice packets over such networks. This technology includes, for example, Voice over IP (VoIP) technology on a broadband IP network.

In other communications technology, mobile/cellular communications devices, such as mobile handsets, have become widely used in modern society. Mobile communications devices such as "smartphones" can allow users to make telephone calls, send or receive electronic mail (e-mail), browse the World Wide Web, check appointments, and get directions, as well as perform many other functions. Such mobile devices typically use cellular networks to handle telephone calls. Cellular networks have also evolved to packet-based communications using Internet Protocol (e.g., 4G LTE service provided by telcos such as Verizon and AT&T).

It is typical for users having cellular phone service to discontinue a phone call on their mobile device and start another call using a fixed communications phone, such as a POTS phone (e.g., telephone connected to the PSTN), or VoIP phone once the users are in their premises. For added convenience, some mobile communication devices include client software that enables the mobile communications device to operate as a multi-modal handset that can communicate via both a non-IP based cellular network, and also via an IP-based packet network, which may be a fixed packet network.

Additionally, a user's multi-modal communication (MMC) device can be configured to allow a user's in-progress communication session, which may be a voice call, to be moved from the mobile/cellular network to the fixed packet (e.g., IP broadband) network, and vice versa, while the user is on the same phone. This "handover" from cellular to IP can occur without any significant notice of interruption or disconnection by the user. For example, a user that initiates a cellular phone call on his or her handset out of the home can continue with the same call on the same handset (but on the IP network) when the user arrives in his/her home. Conversely, if a user having a mobile handset places a call over the IP network, and the signal to the IP network degrades (for example if the user moves outside the premises), the user can continue with the communication on the same mobile handset over the cellular network. Examples of such "fixed-mobile convergence" (FMC) processes are described in U.S. Pat. No. 8,244,251 titled "Concurrent Call Handover," U.S. patent application Ser. No. 13/631,404 titled "Handover of On-Hold Session between Fixed Packet Network and Cellular Network," and U.S. Patent Application Publication Number US 2007/0037578 titled "Method and System for Dynamically Modifying A Dial Plan for a Wireless Dual-Mode Handset," the entirety of each of which is hereby incorporated by reference.

VoIP-based services, whether fixed or mobile, seek to employ a variety of features, which can include call holding (e.g., in the case of a voice call, a logical state in which neither user can hear the other), three way calling/conferencing, voice mail, and call forwarding. Implementations described in this disclosure provide for the establishment of a three-way call via a packet network (which may be an IP fixed packet network or a mobile network) administered by a communications server, including a Session Initiated Protocol (SIP) based server. The SIP protocol is an Application Layer protocol that can operate on Transmission Control Protocol (TCP), User Datagram Protocol (UDP), or Stream Control Transmission Protocol (SCTP). Additionally, SIP is a text-based protocol that incorporates many elements of the Hypertext Transfer Protocol (HTTP) and the Simple Mail Transfer Protocol (SMTP).

BRIEF DESCRIPTION OF THE DRAWINGS

Like reference numbers and designations in the various drawings indicate like elements.

DETAILED DESCRIPTION

In various implementations described in this disclosure, systems and methods can operate to provide for networked-administered three way calls in an IP-based network, including three-way calls administered by a communications server that can function as a Session Initiated Protocol (SIP) based server. In some implementations, the request for a three-way call can be made by a VoIP device, examples of which are described below. The three-way call can be amongst the MMC device and at least two other devices, each of which can connected to communications networks as described below. The following disclosure describes various implementations and changes operable to facilitate the three-way call in more detail. The components used in supporting this feature can include a SIP server operable to facilitate connections between the devices. The SIP server functionality can also be incorporated in a mobility application server (MAS).

Figure 1:
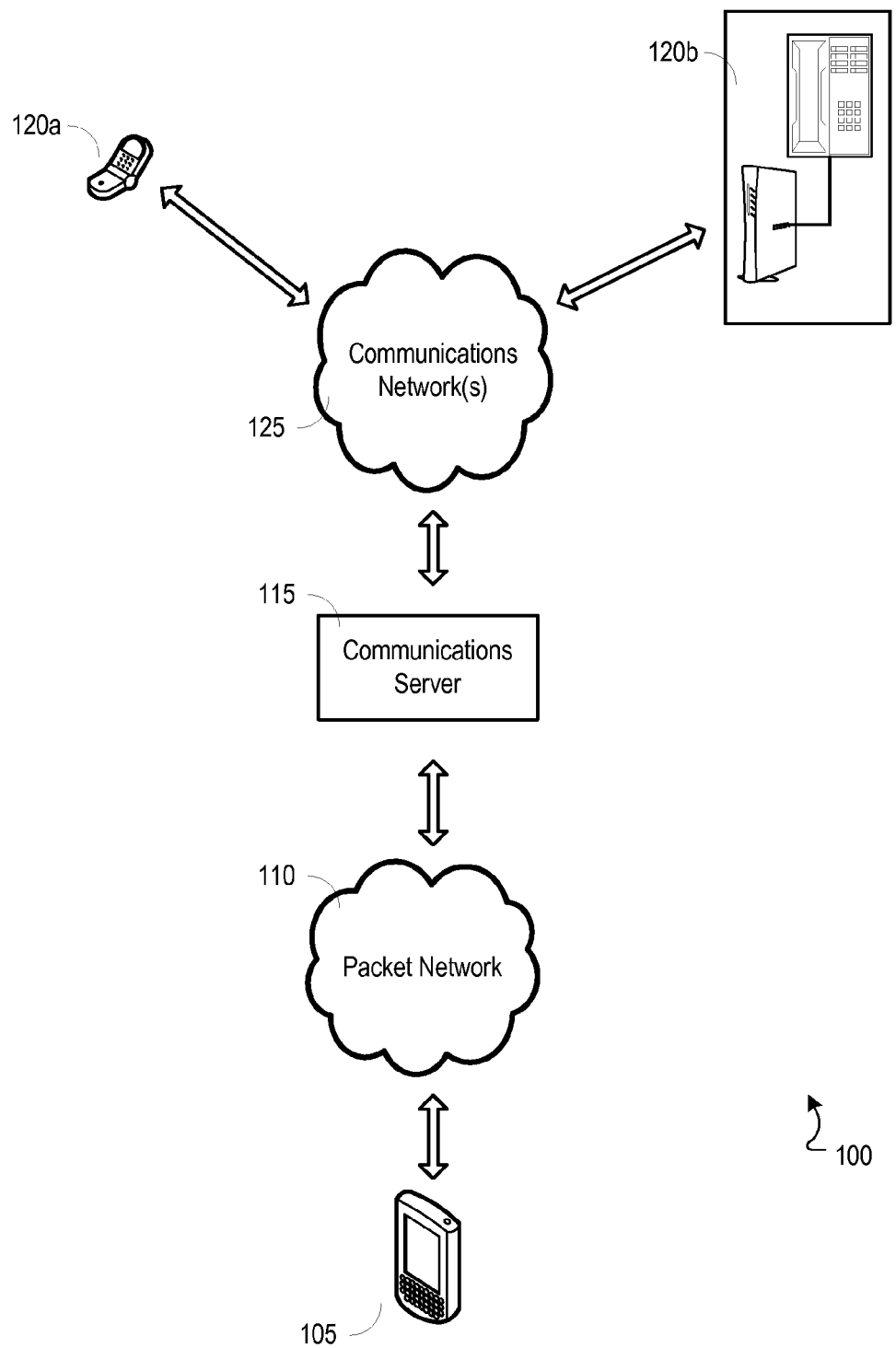
FIG. 1 is a block diagram illustrating an example network environment operable providing for three-way calling administered by a SIP server.

FIG. 1 is a block diagram illustrating an example network environment 100 operable to provide networked-based three-way calling. In some implementations, a VoIP device 105 is operable to initiate the setup of a three-way call. The request can be made via a packet network 110 to a communications server 115 that is operable to interconnect and rout communications. The three-way call can be between the VoIP device 105 and at least two other user equipment (UE) devices 120a-b, each of which can be connected to one or more communications networks 125.

The packet network 110 can include a fixed-packet network. The fixed packet network can be a broadband network using internet protocol (IP) to deliver video, voice, and data. An example of such a network is a cable television (CATV) infrastructure implementing the data over cable service interface specification (DOCSIS) and PacketCable standards, which allow MSOs to offer both high-speed Internet and VoIP through an MSO's cable infrastructure. In some implementations, the fixed packet network can have head-end equipment such as a cable modem termination system (CMTS) that communicates through one or more hybrid fiber coax (HFC) networks with user premises equipment such as a cable modem or embedded multimedia terminal adapter (EMTA). The MMC device can communicate with the fixed packet network through a wireless access point, which can be embedded in the user premises equipment, or can be connected to the user premises equipment. Wireless access point can be a wireless router that operates in accordance with the IEEE 802.11 family of standards.

Packet network 110 can also be a fixed packet network that includes networks using asynchronous transfer mode (ATM), digital subscriber line (DSL), or asymmetric digital subscriber line (ADSL) technology. These networks have typically been provided by telephone companies. ATM and DSL/ADSL equipment can be located at an exchange or central office, and can include integrated DSL/ATM switches, multiplexers such as digital subscriber line access multiplexers (DSLAMS), and broadband remote access servers (B-RAS), all of which can contribute to the aggregation of communications from user equipment onto a high-capacity uplink (ATM or Gigabit Ethernet backhaul) to internet service providers (ISPs). Transmission media connecting the central office and user equipment can include both twisted pair and fiber. For the user to access the DSL network, customer premises equipment (each of which can have its own MAC address), can include, for example, a DSL modem. The DSL modem can also include wireless routing functionality, or can be connected to a wireless access point (e.g., an 802.11 Wi-Fi router).

In some implementations, packet network 110 can include a mobile cellular IP-based network, such as 4G LTE. In addition packet network 110 can also be implemented via legacy T1/T3 lines.

Packet network 110 can also include Wi-MAX networks implementing the IEEE 802.16 family of wireless networking standards, or any combination of those packet switched networks described herein or known in the industry. Wi-MAX broadband network signals, which are wireless, can be accessed directly by a device having a Wi-MAX modem (e.g., a laptop computer with a built in Wi-MAX adapter), or with a plug-in Wi-MAX modem (e.g., USB Wi-MAX modem). Alternatively, the Wi-MAX solution can implemented with fixed packet network equipment, such as a Wi-MAX broadband modem, which can reside at a user residence and be connected to computers and other user devices. An example of one company that provides Wi-MAX services is Clear.

VoIP device 105 can be any device (or system) that can be used to make a call through a packet network. In some implementations, VoIP device 105, can include client software that facilitates its operation as a MMC device that can communicate via both a cellular network and packet network 110, including a fixed packet network.

In some implementations, VoIP device 105 can be a telephone connected to a VoIP adapter that, in turn, is connected to a broadband access modem (e.g., cable modem, DSL modem, Wi-MAX modem, etc.). Alternatively the VoIP device can be connected to a wireless router (e.g., Ethernet or Wi-Fi) that is connected to the broadband access modem. The telephone can be plugged into the VoIP adapter (e.g., via an RJ-11 phone jack). Typical VoIP adapter devices can include software that enables VoIP calls to be placed via the broadband connection. Such a VoIP adapter device can be, for example, the VoIP devices offered by Magic Jack Plus and Vonage.

In some implementations, VoIP device 105 can be a telephone connected to a broadband modem (e.g., cable modem, DSL modem, Wi-MAX modem) that contains a VoIP adapter. For example, an embedded multimedia terminal adapter (EMTA) can be described as a cable modem and a VoIP adapter (e.g., a MTA, multimedia terminal adapter) bundled into a single device. The VoIP adapter can also be integrated into a gateway device that processes video, voice packets and data packets.

In other implementations, VoIP device 105 can be a computer connected to a broadband network that executes VoIP software. This software can allow for voice calls to be made via a computer application (i.e., a "softphone" such as that offered by Skype).

In other implementations, VoIP device 105 can be a telephone connected to a USB (or other computer connector) device that is connected to a computer with broadband (e.g., cable modem, DSL modem, or Wi-MAX modem). The USB device can include software and hardware that enables VoIP telephone calls to be placed via the broadband connection. The USB device can also include a Subscriber Line Interface Circuit (SLIC) that allows telephones to be plugged into the USB device via an interface (e.g., an RJ-11 phone jack). An example of such a USB device is offered by Magic Jack.

Thus, the VoIP device 105 can be an MMC device operative to communicate through the wireless access point connected to a packet network 110, which can include broadband services offered by a cable operator, DSL broadband services offered by a telco, Wi-MAX services, or a LTE services offered by mobile cellular network providers. The VoIP device 105 can also be user premises equipment connected with a telephone or softphone that enables VoIP calls to be made via fixed packet networks.

In example implementations, the communications server 115 can be operable to accept communications from VoIP device 105. The communications server 115 can be a computing device having software that makes it operable to provide the functionalities described herein.

The communications server 115 can handle messaging and routing between a cellular network, a fixed packet network, and a PSTN. In some implementations, the communications server 115 can perform gateway functions. Gateways that link a fixed packet network (e.g., an IP network) with a PSTN, a PSTN with a cellular network, and an IP network with the cellular network are typically deployed and used to route communications, including voice, between the different types of networks. The communications server 115 can process one or more signaling protocols, including but not limited to SIP, SIP-T, GSM, CDMA, MAP, and SS7. For example, in instances in which a session is routed from fixed packet network 115 to the PSTN 120, or a session is routed from the PSTN 120 to fixed packet network 115, the communications server 115 can be used to translate communication protocols (for example, IP to TDM) between the networks. The communications server 115 can be operable to convert packet based voice (e.g., VoIP) communications to circuit switched voice for transmission on the PSTN 120, and can convert circuit switched voice to packet based voice communications for transmission onto a fixed packet network 115.

In example implementations using SIP communications, SIP universal resource identities (URIs) can be used to carry telephone numbers, since the mapping between SIP and telephony protocols has already been defined. The communications server 115 can be operable to function as a SIP proxy server by processing SIP requests and passing the requests downstream, as well as sending SIP responses upstream to other SIP servers or devices. The communications server 115 can also modify SIP requests, and enable session setup, session connect, session management, session teardown, and session modifications. In example implementations, the communications server 115 can also function as one or more of a registrar server, a location service database, a redirect server, a proxy server, or a presence server.

The VoIP device 105 can be operative to use SIP signaling to communicate with the SIP server to establish and manage communications with UE devices 120a-b. UE devices 120a-b can be a cellular mobile phone, an MMC device, or a telephone connected to a VoIP device (e.g., a broadband access modem having (or connected to) a VoIP adapter). As such, communications network(s) 125 can include a packet network (e.g., cable broadband, DSL broadband, Wi-MAX broadband), examples of which were described above, and can even be the same packet network 110 connected to the VoIP device 105.

Communications network(s) 125 can also include a cellular network. The cellular network can be of any variety, including a Global System for Mobile communications (GSM), Universal Mobile Telecommunications System (UMTS), Long Term Evolution (LTE), Code Division multiple access (CDMA) system, General Packet Radio Service (GPRS), Evolution-Data Optimized (EV-DO), Enhanced Data Rates for GSM Evolution (EDGE), 3GSM, Digital Enhanced Cordless Telecommunications (DECT), Digital AMPS (IS-136/TDMA), and Integrated Digital Enhanced Network (iDEN). Typical multiplexing schemes used by these networks can include, among others, frequency division (FDM), time division multiple access (TDM), code division multiplex (CDM), and space division multiplex (SDM), each of which can use appropriate access schemes (e.g., FDMA, TDMA, CDMA, and SDMA). Mobile devices 115a-d, 130 can include cellphones, smartphones, portable computing devices, as well as other devices capable of carrying data and voice.

The communications network(s) 125 can also include a conventional telephone network, also known as a PSTN.

Having described an example network implementation in FIG. 1, operations between the components of FIG. 1 will now be described by way of example with reference to a VoIP device 105 that includes an MMC device operable to communicate through a wireless access point (e.g., Wi-Fi router) of a packet network 110. To implement a three-way call, a first session between the VoIP device 105 and a UE device 120a-b can be established. The first session can be established based upon a request by VoIP device 105 through the packet network 110, or it can be a session that has been handed over from a circuit switched cellular network.

The first session can be initiated by VoIP device 105 when a wireless LAN is in range of the VoIP device 105. The VoIP device 105 can communicate with the communications server 115 through packet network 110 via the wireless access point connected to the packet network 110. In the case of a voice call, the mobile communications device can be operable to send and receive voice packets through the fixed packet network 110. Once a session request has been made by the VoIP device 105, the communications server 115 can be operable to facilitate the establishment, teardown, or modification of sessions between VoIP device 105 and other peer devices, including UE device 120a-b.

The first established session can also be a session that has been handed over from the cellular network (not shown) domain to the packet network 110. As an example, the session can be between a VoIP device 105 and a UE device 120a (e.g., a cellular phone connected to communications network(s) 125). The result of the handover in this example would be that the VoIP device 105 would be communicating through packet network 110, as shown in FIG. 1, instead of a through the cellular network. The packet network 110 can be extended via a wireless LAN established by a wireless access point (e.g., Wi-Fi router).

To establish the communication through the cellular domain prior to the handover, VoIP device 105 can initiate a session with UE device 120a via the cellular network. The FMC mobile device 130 can send an active session request (e.g., a session setup request) through the cellular network 110 to the communications server 115. The communications server 115, upon receiving the request, can facilitate the session setup between the VoIP device 105 and the UE device 120a. Some example implementations of an active session establishment process can be found in the aforementioned publications U.S. Pat. No. 8,244,251 titled "Concurrent Call Handover," and U.S. patent application Ser. No. 13/631,404 titled "Handover of On-Hold Session between Fixed Packet Network and Cellular Network."

When VoIP device 105 enters the wireless transmission/ reception range of local wireless access point, a handover request can be initiated by the VoIP device 105. In some implementations, the VoIP device 105 can be registered or associated with the WLAN. Typical wireless routers can continuously generate a signal (e.g., a beacon), which can be referred to as a presence signal, indicating that the wireless network is active. This signal, which can be received by the VoIP device 105, typically includes an identifier, such as the Basic Service Set Identifier (BSSID), which is a unique identifier related to the MAC address of the wireless access point 145.

Upon receiving the presence signal from wireless access point 145, the VoIP device 105 can be operable to transmit the BSSID of wireless access point 145 to the communications server 115. The BSSID can be transmitted by the VoIP device 105 via, for example, a SIP message through the fixed packet network 115. Another mechanism for transporting BSSID information corresponding to the wireless network in which the VoIP device 105 is currently present may include using P-Access-Network-Info which is known in the art for transmitting network type. It will be appreciated that other formats/protocols may also be used to transmit/forward the BSSID of the WLAN to the communications server 115. The communications server 115 can be operable to accept and handle the handover of a session from the cellular network to the packet network 110. When the communications server 115 receives a handover request (e.g., including the handover PSI, appropriate identifiers for the WLAN network, FMC user account information for the mobile communications device 105) from the VoIP device 105, the communications server 115 processes the request. The processing can include updating dynamic databases, request authentication, and performing the handover via the fixed packet network 115, as described above.

Prior to the handover, the anchor point for the session would have two connection points. One anchor point would be for the communications server 115—VoIP device 105 through the cellular network (not shown), and the other would be for the communications server 115—UE device 120a through the communication network(s) 125. After the handover, the anchor point would feature the communications server 115—VoIP device 105 connection point through the packet network 110, while the communication server 115—UE device 120a connection point through communication network(s) 125 is maintained.

Typically, three way calls, and other conference calls, are implemented by putting one party on hold, while setting up another connection with a second party. The aforementioned U.S. patent application Ser. No. 13/631,404 titled "Handover of On-Hold Session between Fixed Packet Network and Cellular Network," describes various implementations of call holding. In prior art systems, three way communication between IP phones (i.e., devices using VoIP), is handled at the device level. As an example, a three way call can be established between a VoIP phone A, a VoIP phone B, and a VoIP phone C. VoIP phone A can initiate a first communication session with VoIP phone B. VoIP phone A can then place VoIP phone B on hold, and initiate a second communication session VoIP phone C. Once VoIP phone B has been taken off hold, VoIP phone A can implement three way calling by sending its own packets to VoIP phones B and C. For VoIP phone B to receive the voice packets from C, and for VoIP phone C to receive the voice packets from B, VoIP phone A routes those packets to VoIP phone B and VoIP phone C after it receives them. In this manner, three way calls are administered at the device level through two connections.

The present application discloses a networked based solution in which a communications server (e.g., communications server 115) can implement three way calls at the network level (not device level) between a VoIP device (e.g., VoIP device 105) and at least two other peer user devices (e.g., UE device 120a, UE device 102b). The initial call can be made from the VoIP device 105 to one of the peer user devices (e.g., UE device 120a) via the communications server 115. The communications server 115 can be operative to process a request from the VoIP device 105 to place the communications session with UE device 120a on hold. The communications server 115 can send an indication to the VoIP device that it can begin transmitting information needed by the communications server 115 to set-up a second call with the second peer user device (e.g., UE device 120b).

The information needed by the communications server 115 can be, for example, carried by DTMF signals having the phone number of UE device 120b. Without initiating another communication session, the VoIP device 105 can be operative to send these DTMF signals to the communications server 115a. The communications server 115a, after receiving the DTMF signals, can generate a call to UE device 120b. After UE device 120b answers, the communications server 115 can send a message to the VoIP device 105 indicating that UE device 120b is now exchanging media (e.g., voice), and that UE device 120a is still on hold.

The VoIP device can then send a message to the communications server 115a indicating that it would like to have a three way call between itself, UE device 120a, and UE device 120b. The communications server 115a can then set up the three way call between the devices.

Figure 2:
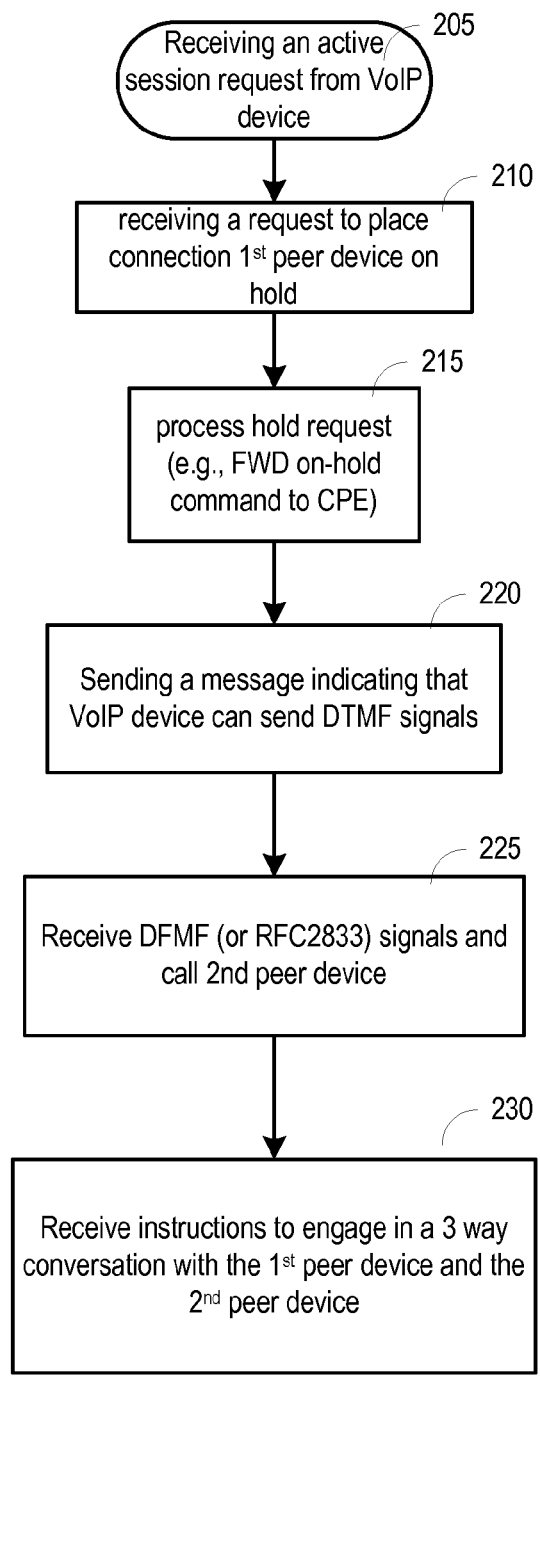
FIG. 2 is a flow chart illustrating an example implementation of the provision of a three-way call administered by a communications server.

FIG. 2 shows a flow chart illustrating an example method 200 for implementing a packet network-based three-way call performed by a communications server (e.g., communications server 115) that can process SIP messages. The three-way call can be between a VoIP device (e.g., VoIP device 105) and at least two other peer user devices (e.g., UE device 120a, UE device 102b).

At stage 205, the communications server (e.g., communications server 115) can be operable to process a SIP connection request from a VoIP device (e.g., VoIP device 105) to establish a communication session between the VoIP device and a first peer user device (e.g., UE device 120a). The VoIP device can communicate through a packet network (e.g., packet network 110) with the communications server, and the communications server can communicate through a communications network (e.g., communications network 125, or packet network 110) with the first peer user device. The VoIP device can use SIP signaling protocols to establish the communications session with the first peer user device via the communications network, which can also be operable to process SIP signals.

At stage 210, a request can be received to place the call between the VoIP device and the first peer user device on hold. The request can be received by the communications server (e.g., communications server 115), and the request can be made by the VoIP device (e.g., VoIP device 105). When the user of the VoIP device wishes to establish a three way call, the user can input a command (e.g., depress a button, or graphical user interface) to place the current communication session with the first peer user device on hold. The hold signal can be in the form of, for example, a SIP info signal. The SIP info signal can have unique content, for example, Content-Length: 25
Content-Type: application/dtmf-relay
Signal=16
Duration=1.0

At stage 215, the hold request can be processed. In some implementations, after receiving an on hold-request from the VoIP device (e.g., VoIP device 105), the communications server (e.g., communications server 115) can discard voice packets going between the VoIP device and the first peer device (e.g., UE device 120a). The hold-request signal can be, for example, a SIP Info signal, whereby the communications server can be operable to respond to the SIP Info signal by discarding voice packets going between the VoIP and the first peer device.

In some hold processing implementations, the VoIP device can respond to the user command to place the communication session on-hold by not sending out any media (or by sending out only background or white noise, or music or commercial ads), and also by discarding any media it receives.

In some hold processing implementations, after receiving an on hold-request from the VoIP device, the communications server can transmit (or forward) the hold request to the first user device. The first user device can process the hold-request by discarding packets it receives the VoIP device, and by not sending out any media (or by sending out only background or white noise, or music or commercial ads).

In other hold processing implementations, the first peer device, upon receiving a hold request, can be placed in a "send only" state, and the VoIP device can be programmed to discard packets it receives; the call's status is that of being on-hold, since the first peer device is not receiving media (i.e., in a send only state), and the VoIP device is discarding media it receives.

At step 220, signals can be sent to the VoIP device (e.g., VoIP device 105) indicating to the VoIP device that it can begin transmitting DTMF (dual-tone multi-frequency) signals to the communications server (e.g., communications server 115). The indication messages can be sent by the communications server. An example of an indication message that can be sent is a SIP Re-invite message.

The VoIP device (e.g., VoIP device 105) can be operable to process the received SIP Re-invite message by sending in-band DTMF signals (or RFC2833) to the communications server. The DTMF signals can be generated by the VoIP device within the existing communication session. The signal can have the number of the second peer device (e.g., UE device 120b) that the VoIP device wishes to have the three way conversation with.

At step 225, the communications server (e.g., communications server 115) can be operable to receive the in-band DTMF signals (or RFC2833). The communications server collects all the digits embedded in the DTMF (or RF2833) signals and uses it to initiate a call to the second peer device (e.g., UE device 120b).

At step 230, the communications server (e.g., communications server 115) can receive instructions from the VoIP device (e.g., VoIP device 105) to engage in a conference with the first peer device and the second peer device. The signal from the VoIP device indicating that the user of the VoIP device wishes to engage in the conference can be, for example, a DTMF 3 sent to the communications server.

In addition, the communications server (e.g., communications server 115) can be operable to receive instructions from the VoIP device (e.g., VoIP device 105) to split the conference.

Figure 3:
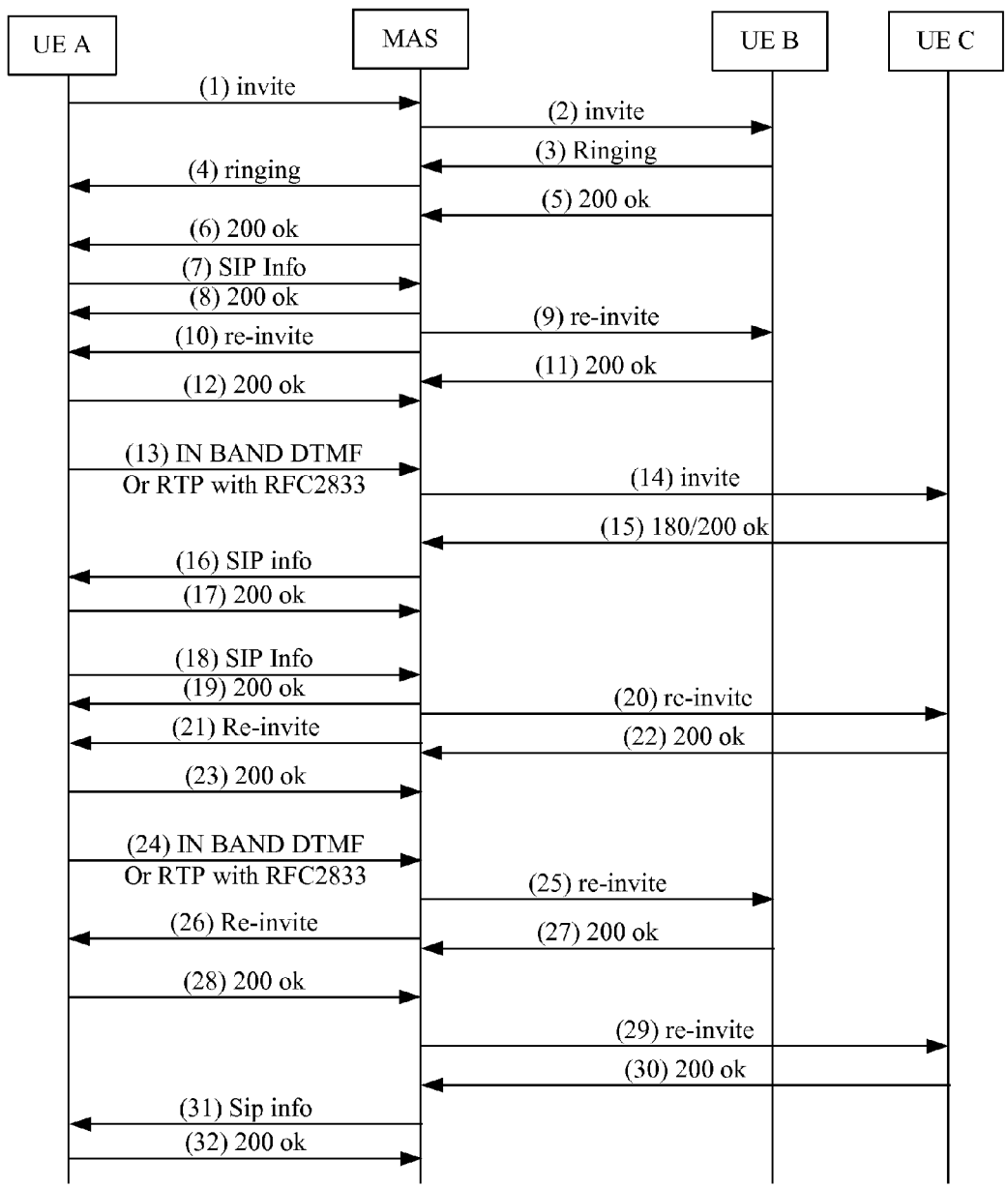
FIG. 3 shows a sequence diagram illustrating an example implementation of a three-way call administered at the network level by a communications server

FIG. 3 shows a sequence diagram illustrating an example implementation of a three-way call administered at the network level by a communications server (e.g., communications server 115). Each stage contains transmissions that can include SIP or DTMF messages.

Referring to FIG. 3, in which the UE A refers to the VoIP device (e.g., VoIP device 105), MAS (an acronym for mobility application server) refers to the communications server (e.g., communications server 115), UE B refers to the first peer device (e.g., UE device 120a), and UE B refers to a second the second peer (device (e.g., UE device 120b).

In FIG. 3, stages (1) through (6) describes a typical call set-up process in which VoIP device UE A uses normal SIP messaging to initiate a call to UE B via the MAS. The MAS processes the request, and sends the INVITE to UE B.

In stage (7), when a user wants to initial a 3 way call, UE A can send a request for UE B to be placed on hold while it initiates a call to UE B. The request can come in the form of a SIP INFO to the MAS. The SIP INFO message can contain the following content information:
Content-Length: 25
Content-Type: application/dtmf-relay
Signal=16
Duration=1.0

In stages (8) through (12), 5-7, the MAS replies to this info message with a SIP 200 OK and sends a re-invite message back to indicate the UE can send DTMF to MAS. It can also send a re-invite message back to UE B to initiate silence (or music, or some other audio) while UE B is on hold.

At stage (13) through stage (15), UE A can send UE C's phone number through an in-band DTMF (or using RFC2833 to carry DTMF information). The MAS collects all digits and generates the call to party UE C. UE C can answer the call, thus connecting UE A and UE C.

At stages (16) to (17), upon receiving the answer from UE C, the MAS can send a SIP INFO message to UE A to indicate that C is talking and B is on hold. The content can be as follows:
Content-Length: xx . . . .
Content-Type: application/call-status
State=two conn
User number=C 1 (note: 1 means talk, 0 means on hold)
User number=B 0

In this case, UE A should show UE C is in active and talking and UE B is on hold.

At stages (18) to (23), if UE A's user wants to setup a conference call with UE B and UE C (e.g., a three-way call), UE A can send a SIP INFO message to the MAS and wait for a re-invite message. The content information in this INFO message can be the same as that in the SIP INFO message of stage (7).

At stages (24) through (25), after UE A confirms the re-invite message at stage 23, it can send a DTMF digit "3" to set the conference call between UE A, UE B, and UE C (alternatively, a DTMF digit "2" can be sent to switch between the conversations of UE B and UE C).

At stages (26) to (28), the MAS establishes the conference.

At stages (31) to (32), the MAS sends an INFO message to indicate the conference status. The INFO message can have the following content information.
Content-Length: xx
Content-Type: application/call-status
State=conf The VoIP device UE A can split the conference by sending another INFO and dialing a DTMF digit "2." The MAS would send an INFO message back to indicate the three-way call status.
Content-Type: application/call-status . . . .
Content-Length: xx . . . .
State=conf/two conn/one conn
User number=xxxxxxxx 1 (note: 1 means talk, 0 means on hold)
User number=xxxxxxxx 0

If at any time UE A receive INFO with following content, UE A can allow it to initialize a three-way call again:
   Content-Type: application/call-status . . . .
   Content-Length: xx . . . .
   State=one conn
   User number=xxxxxxxx 1

Figure 4:
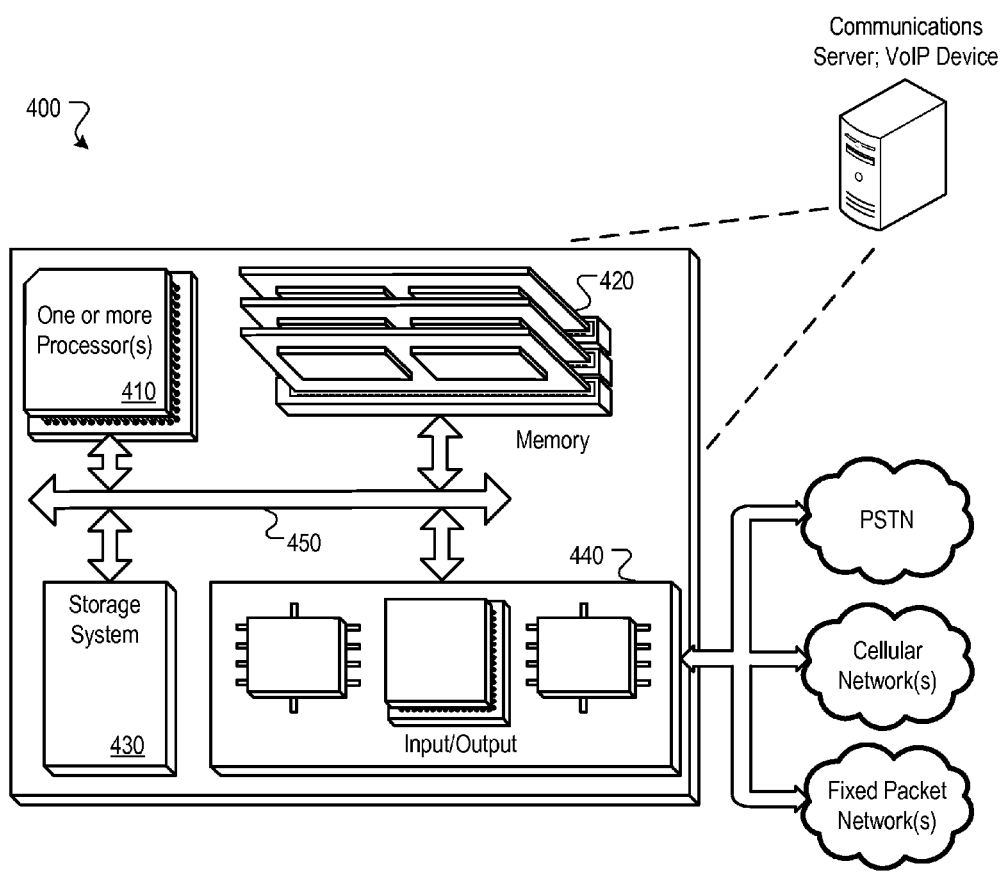
FIG. 4 is a block diagram illustrating an example of a communications hardware device, which can be that of a communications server, or a VoIP device, that can be used to process the three-way call.

FIG. 4 is a block diagram illustrating some components of an example communications server 115, as well as some of the components of a VoIP device 105 operable to facilitate conference calls in accordance with the description herein. The hardware 400 can include a processor 410, a memory 420, a storage device 430, and an input/output device 440. Each of the components 410, 420, 430, and 440 can, for example, be interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the device 400. In one implementation, the memory 420 is a computer-readable medium. In one implementation, the memory 420 is a volatile memory unit. In another implementation, the memory 420 is a non-volatile memory unit.

In some implementations, the storage device 430 is capable of providing mass storage for the device 400. In one implementation, the storage device 430 is a computer-readable medium. In various different implementations, the storage device 430 can, for example, include a hard disk device, an optical disk device, flash memory or some other large capacity storage device.

The input/output device 440 provides input/output operations for the device 400. In one implementation, the input/output device 440 can include one or more of a PSTN trunk interface (e.g., an RJ11 connector), an IP network interface device, e.g., an Ethernet card, a cellular network interface, a serial communication device, e.g., and RS-232 port, and/or a wireless interface device, e.g., and 802.11 card. In another implementation, the input/output device can include driver devices configured to receive input data and send output data to other input/output devices, as well as sending communications to, and receiving communications from various networks.

The communications server (i.e., the MAS) and VoIP device (e.g., UA A) of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor" encompasses all apparatus, devices, and machines for processing data, including by way of example a programmable processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors (general microprocessors being transformed into special purpose microprocessor through the application of algorithms described herein), and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operably coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, implementations of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular implementations of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A method for establishing a conference call between a VoIP device, a first peer device, and a second peer device, the method comprising:
    sending a first session request through a fixed packet network to a communications server, wherein the first session request is used to establish a first communication session between the VoIP device and the first peer device, the first communication session comprising a link between the VoIP device and the communications server and further comprising a link between the communications server and the first peer device;
    sending a request to place the first communication session between the VoIP device and the first peer device in an on hold condition, wherein the on hold condition is maintained by placing the VoIP device in a receive-only state and by configuring the VoIP to discard any media received from the first peer device; and
    while the first communication session between the VoIP device and the first peer device is maintained in the on hold condition:
        receiving at the VoIP device an indication message from the communications server, wherein the indication message comprises an invitation for the VoIP device to begin transmitting information that is needed by the communications server to initiate a second communication session between the VoIP device and the second peer device;
        sending a second session request, wherein the second session request comprises one or more signals carrying information that is used, by the communication server, to initiate the second communication session between the VoIP device and the second peer device, the second communication session comprising the link between the VoIP device and the communications server and further comprising a link between the VoIP device and the second peer device; and
        sending a switch request to the communications server, wherein the switch request initiates a switch between the first communication session and the second communication session at the VoIP device.

2. The method of claim 1, wherein the on hold condition is maintained by placing the first peer device in a receive-only state and by configuring the first peer device to discard any media received from the VoIP device.

3. The method of claim 1, wherein the second session request comprises one or more multi-frequency signals.

4. The method of claim 3, wherein the one or more multi-frequency signals are output as one or more SIP packets.

5. The method of claim 1, wherein the fixed packet network comprises a broadband network, an Internet protocol (IP) network, a data over cable network, or a cellular network.

6. The method of claim 1, wherein the first session request comprises a SIP Invite.

7. The method of claim 1, wherein the request to place the first session between the VoIP device and the first peer device on hold comprises a SIP INFO message.

8. The method of claim 1, wherein the second session request comprises a number associated with the second peer device.

9. The method of claim 1, wherein the first communication session, the second communication session, or both the first communication session and second communication session comprise a video call.

10. One or more non-transitory computer readable media having instructions operable to cause one or more processors to perform the operations comprising:
    sending a first session request through a fixed packet network to a communications server, wherein the first session request is used to establish a first communication session between a VoIP device and a first peer device, the first communication session comprising a link between the VoIP device and the communications server and further comprising a link between the communications server and the first peer device;

sending a request to place the first communication session between the VoIP device and the first peer device in an on hold condition, wherein the on hold condition is maintained by placing the first peer device in a send-only state and configuring the VoIP device to discard any packets received from the first peer device; and while the first communication session between the VoIP device and the first peer device is maintained in the on hold condition:

receiving at the VoIP device an indication message from the communications server, wherein the indication message comprises an invitation for the VoIP device to begin transmitting information that is needed by the communications server to initiate a second communication session between the VoIP device and a second peer device; and sending a second session request, wherein the second session request comprises one or more signals carrying information that is used, by the communication server, to initiate the second communication session between the VoIP device and the second peer device, the second communication session comprising the link between the VoIP device and the communications server and further comprising a link between the VoIP device and the second peer device; and sending a switch request to the communications server, wherein the switch request initiates a switch between the first communication session and the second communication session at the VoIP device.

11. The one or more non-transitory computer readable media of claim 10, wherein the VoIP device is operable to communicate through a fixed packet network, and also through a cellular network.

12. The one or more non-transitory computer readable media of claim 10, wherein the first session request comprises a SIP Invite.

13. The one or more non-transitory computer readable media of claim 10, wherein the request to place the first session between the VoIP device and the first peer device on hold comprises a SIP INFO message.

14. A communications server comprising:

one or more processors configured to establish a first session between a VoIP device and a first peer device in response to receiving a first session request from a VoIP device through a fixed packet network, the first session comprising a link between the VoIP device and the communications server and further comprising a link between the communications server and the first peer device;

an interface configured to be used to receive a request from the VoIP device to place the first session between the VoIP device and the first peer device in an on-hold condition;

the one or more processors being further configured to place the first session in an on-hold condition, wherein the on-hold condition is maintained by placing the VoIP device in a receive-only state and by configuring the VoIP to discard any media received from the first peer device;

the one or more interfaces being further configured to be used to, while the first session is in the on-hold condition:

output an indication message to the VoIP device, the indication message indicating to the VoIP device that the communications server is ready to receive information that is needed by the communications server to initiate a second communication session between the VoIP device and a second peer device; and receive a second session request from the VoIP device, wherein the second session request comprises one or more signals carrying information for establishing the second communication session between the VoIP device and the second peer device, the second communication session comprising the link between the VoIP device and the communications server and further comprising a link between the VoIP device and the second peer device; and sending a switch request to the communications server, wherein the switch request initiates a switch between the first communication session and the second communication session at the VoIP device; and one or more processors configured to establish a conference call between the VoIP device, the first peer device, and the second peer device.

15. The communications server of claim 14, wherein the first session request comprises a SIP Invite.

16. The communications server of claim 14, wherein the request to place the first session between the VoIP device and the first peer device in an on-hold condition comprises a SIP INFO message.

17. The communications server of claim 14, wherein the one or more signals carrying information for establishing the second communication session between the VoIP device and the second peer device comprise one or more multi-frequency signals.

* * * * *